(12) United States Patent
Corwin

(10) Patent No.: US 6,870,100 B2
(45) Date of Patent: *Mar. 22, 2005

(54) WIRING INSTALLATION DEVICE AND ASSOCIATED METHOD

(76) Inventor: James E. Corwin, 907 Primrose La., Jefferson City, MO (US) 65109-1827

( * ) Notice: Subject to any disclaimer, the term of this patent is extended or adjusted under 35 U.S.C. 154(b) by 0 days.

This patent is subject to a terminal disclaimer.

(21) Appl. No.: 10/785,511

(22) Filed: Feb. 24, 2004

(65) Prior Publication Data

US 2004/0163838 A1 Aug. 26, 2004

Related U.S. Application Data

(63) Continuation-in-part of application No. 10/283,764, filed on Oct. 30, 2002, now Pat. No. 6,696,642.

(51) Int. Cl.⁷ ................................................. H01H 9/02
(52) U.S. Cl. .......................... 174/58; 174/50; 174/135; 174/53; 174/48; 220/4.02; 33/DIG. 10
(58) Field of Search ............................... 174/58, 50, 48, 174/53, 135, 68.1, 65 R; 220/4.02, 3.3, 3.9; 248/906, 343; 439/535; 33/DIG. 10

(56) References Cited

U.S. PATENT DOCUMENTS

| | | |
|---|---|---|
| 1,066,706 A | 7/1913 | Caine |
| 2,130,307 A | 9/1938 | McGovern |
| 2,459,659 A | 1/1949 | Kolb |
| 2,670,919 A | 3/1954 | Esoldi |
| 2,809,002 A | 10/1957 | Rudolph |
| 3,619,476 A | 11/1971 | Rasmussen |
| 4,041,238 A | 8/1977 | Penczak |
| 4,778,134 A | 10/1988 | Struthers et al. |
| 4,909,405 A | 3/1990 | Kerr, Jr. |
| 5,074,515 A | 12/1991 | Carter, Jr. |
| 5,183,233 A | 2/1993 | LaPalomento |
| 5,303,894 A | 4/1994 | Deschamps et al. |
| 5,388,795 A | 2/1995 | Struthers et al. |
| 5,448,011 A | 9/1995 | Laughlin |
| 5,573,321 A | 11/1996 | Bell, Jr. |
| 5,721,394 A | 2/1998 | Mulks |
| 5,773,757 A | 6/1998 | Kenney et al. |
| 5,954,304 A | 9/1999 | Jorgensen |
| 6,005,190 A | 12/1999 | Stark et al. |
| 6,147,304 A * | 11/2000 | Doherty ........................ 174/48 |
| 6,323,424 B1 | 11/2001 | He |
| 6,384,334 B1 * | 5/2002 | Webb ............................ 174/58 |
| 6,437,241 B1 | 8/2002 | Neujahr |
| 6,646,201 B1 * | 11/2003 | Gretz ............................ 174/58 |
| 6,722,621 B2 * | 4/2004 | Johnson ....................... 248/343 |
| 6,734,356 B1 * | 5/2004 | Gretz ............................ 174/58 |
| 6,794,573 B1 * | 9/2004 | Ofcharsky et al. ............. 174/58 |
| 2003/0051894 A1 | 3/2003 | Westlake |

OTHER PUBLICATIONS

Four photo images (2000).

* cited by examiner

Primary Examiner—Dhiru R. Patel
(74) Attorney, Agent, or Firm—Barnes & Thornburg

(57) ABSTRACT

A wiring installation device for use in pre-wiring a facility is disclosed. The wiring installation device includes a cover support unit to be attached to the frame of the facility. A cover of the wiring installation device is configured to attach to the cover support unit to cover a hole in the wall. An associated method is also disclosed.

25 Claims, 18 Drawing Sheets

US 6,870,100 B2

WIRING INSTALLATION DEVICE AND ASSOCIATED METHOD

This disclosure is a continuation-in-part of U.S. patent application Ser. No. 10/283,764, which was filed Oct. 30, 2002 now U.S. Pat. No. 6,696,642 and is hereby incorporated by reference herein.

BACKGROUND

The present disclosure relates to pre-wiring a facility. In particular, the disclosure relates to installation of wiring in a facility before a system that will receive a service from the wiring is installed in the facility.

Wiring may be installed in a facility during construction of the facility so that the facility is "pre-wired." At some later time, a system (e.g., audio system, video system, security system, computer system) may be installed in the facility and attached to the previously installed wiring to receive a service (e.g., audio signal, video signal, data transmission) from the wiring.

SUMMARY

According to the present disclosure, a wiring installation device is provided for installing wiring in a facility to facilitate subsequent identification of the location of the wiring for attachment of the wiring to a system to provide a service thereto. The wiring installation device comprises a cover support unit, a wiring retainer, and a cover.

The cover support unit is configured to extend behind the rear side of a wall of the facility and comprises a mount. The mount is configured to be attached to a pair of frame members of the facility and comprises a mount hole that extends through the mount and is configured to be aligned with a wall hole formed in the wall.

The wiring retainer is used to retain wiring adjacent the wall hole. The wiring retainer is, for example, a retainer hole formed in the cover support unit rearward of the mount for retention of wiring extending through the retainer hole.

The cover is configured for movement relative to the cover support unit between an uncovered position and a covered position. In the uncovered position, the cover uncovers the wall hole. In the covered position, the cover covers the wall hole adjacent a front side of the wall, extends through the wall hole and the mount hole, and is attached to the cover support unit at a location rearward of the mount. Attachment of the cover to the cover support unit occurs at such a rearward location minimizes the risk that wall texturing media sprayed or otherwise applied onto the wall front side will be applied to the surfaces of the cover support unit which cooperate with the cover for attachment of the cover to the cover support unit. The risk that the wall texturing media will interfere with attachment of the cover to the cover support unit is thereby minimized.

DETAILED DESCRIPTION OF THE DRAWINGS

Figure 1:
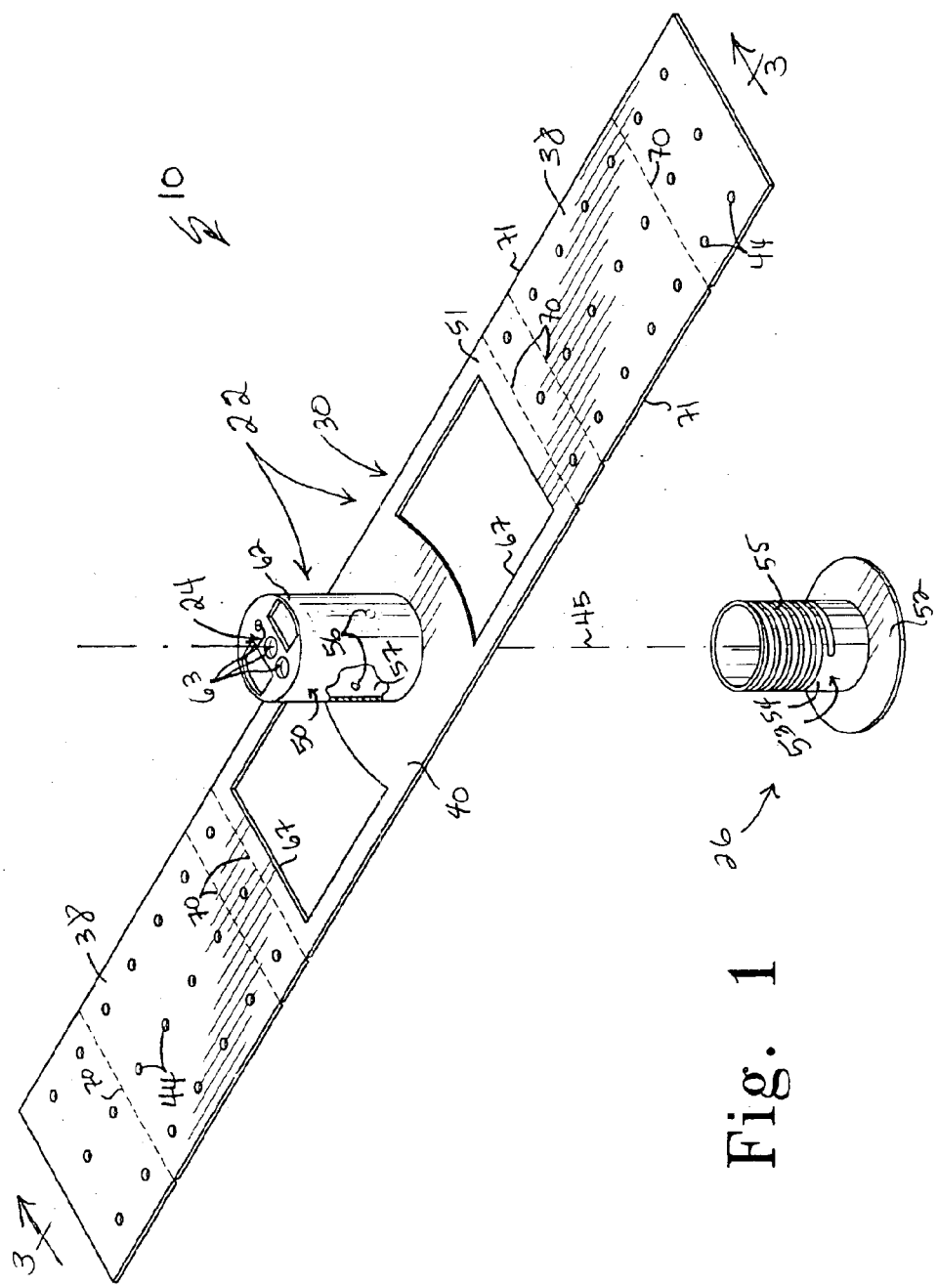
FIG. 1 is a perspective view of a first wiring installation device.
Figure 2:
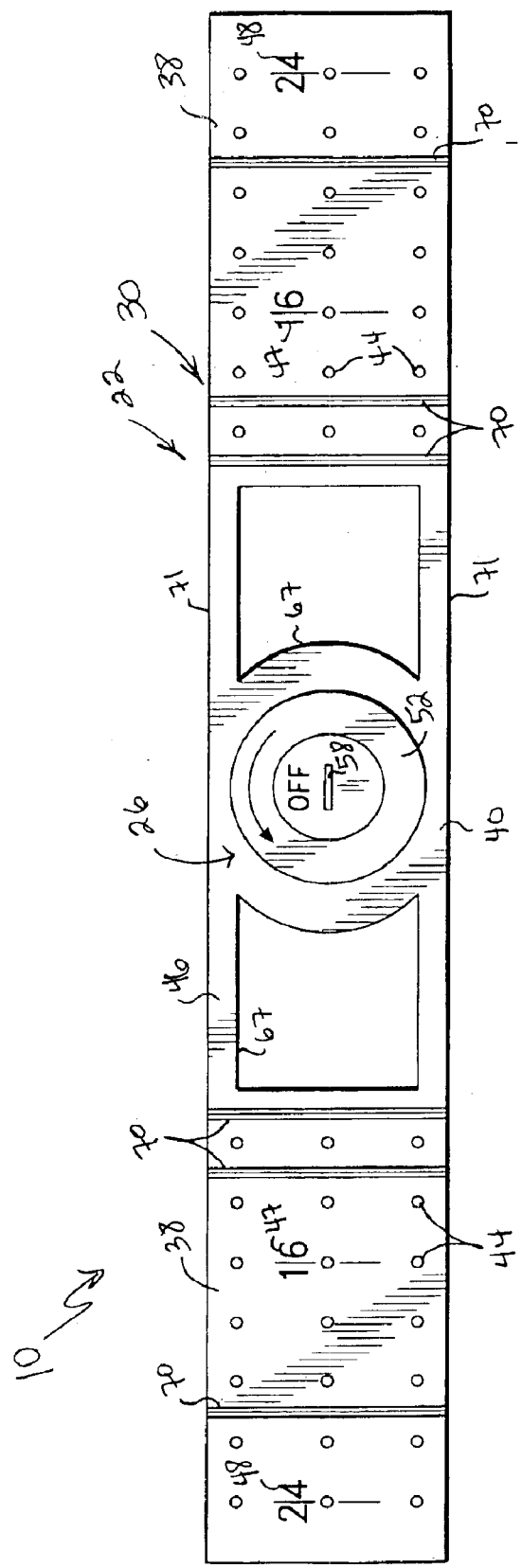
FIG. 2 is a bottom view of the first wiring installation device.
Figure 3:
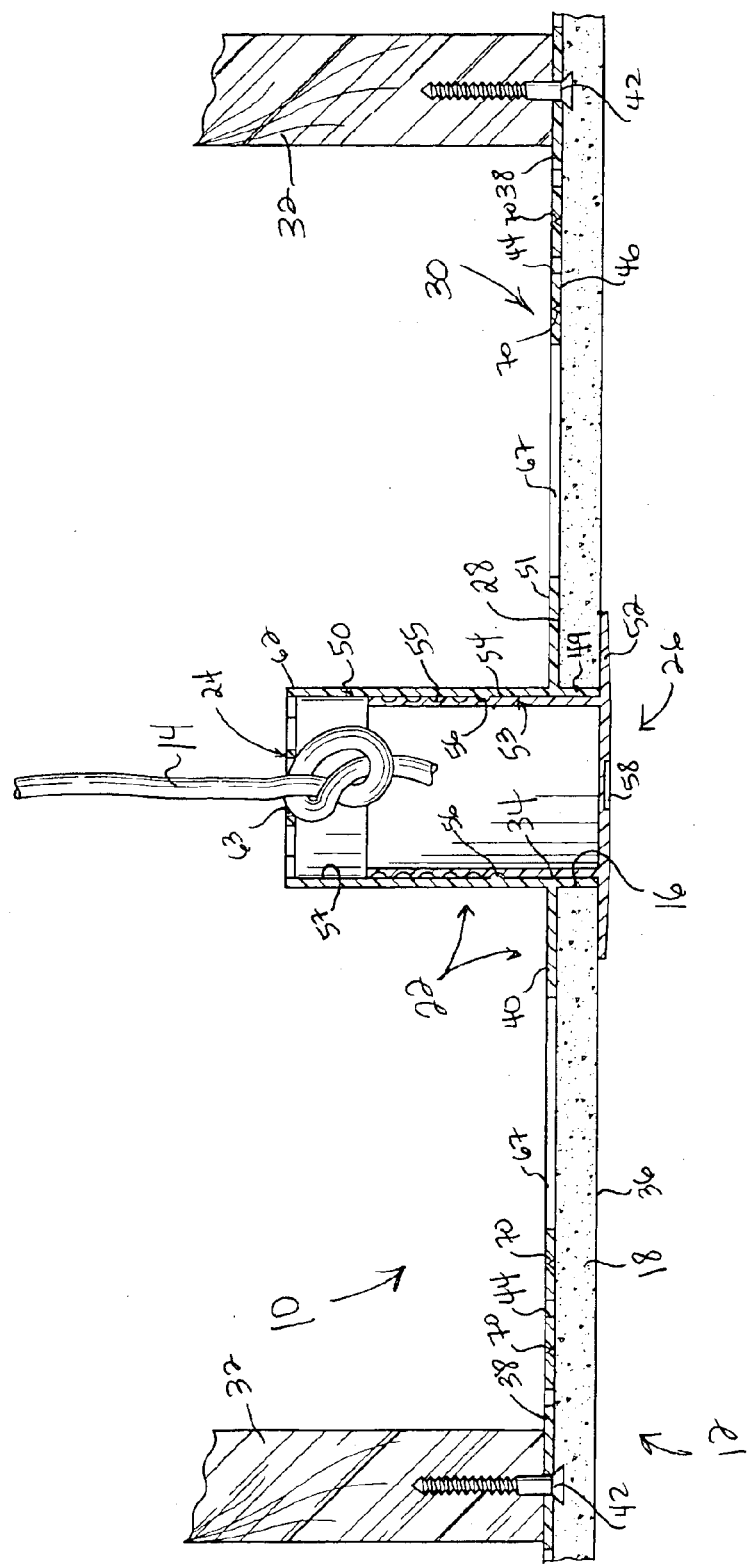
FIG. 3 is a sectional view taken along lines 3—3 of FIG. 1 showing mounting of the first wiring installation device in a facility to retain wiring adjacent a hole formed in a wall of the facility for subsequent identification of the location of the wiring.

A first wiring installation device 10 for use in "pre-wiring" a facility 12 is shown, for example, in FIGS. 1–3. Device 10 is used to retain wiring 14 adjacent a wall hole 16 formed in a wall 18 (e.g., ceiling, vertical or inclined side wall) of facility 12 to facilitate later identification of the location of wiring 14 in facility 12 for attachment of wiring 14 to a system 20 (e.g., audio system, video system, security system, computer system) to provide a service (e.g., audio signal, video signal, data transmission) thereto.

Device 10 comprises a cover support unit 22, a wiring retainer 24, and a cover 26 as shown, for example, in FIGS. 1–3. Cover support unit 22 extends behind a rear side 28 of wall 18 and comprises a mount 30 that is attached to a pair of frame members 32 of facility 12 and comprises a mount hole 34 that extends through mount 30 and is aligned with wall hole 16. Wiring retainer 24 is used to retain wiring 14 adjacent wall hole 16 and is attached, for example, to cover support unit 22.

Figure 4:
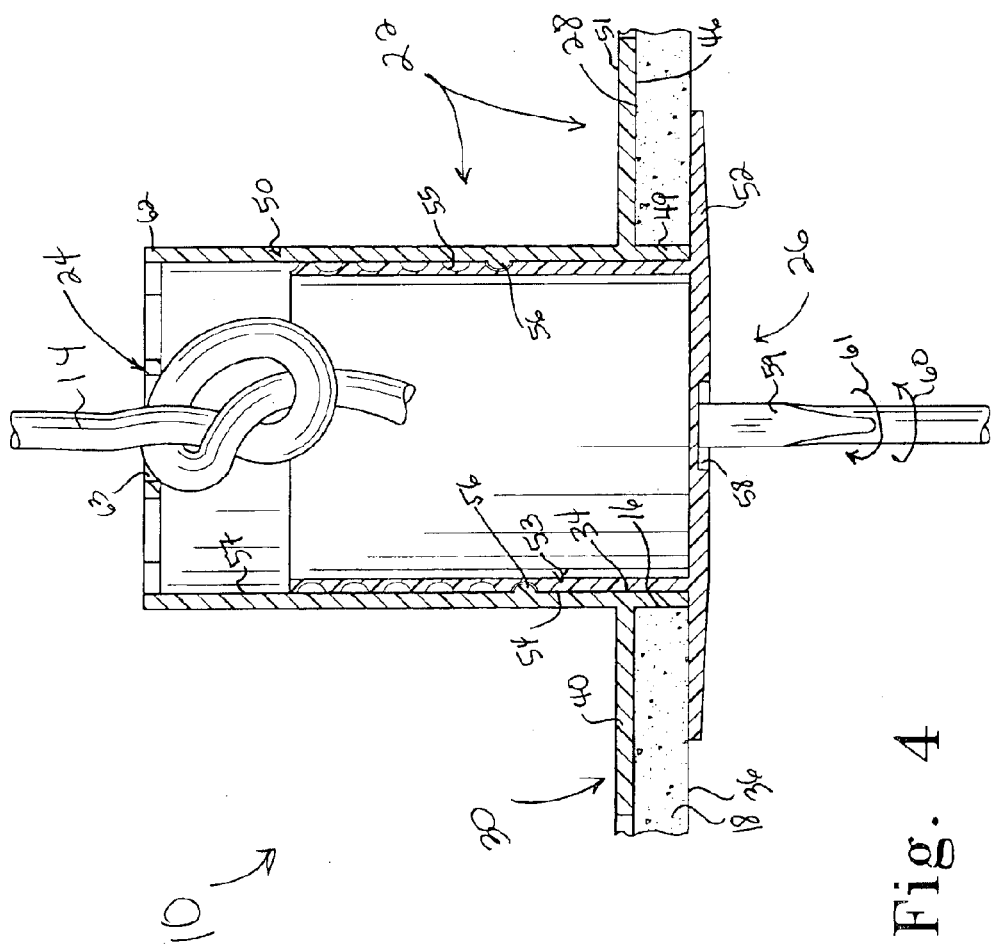
FIG. 4 is an enlarged sectional view of components of the first wiring installation device.
Figure 5:
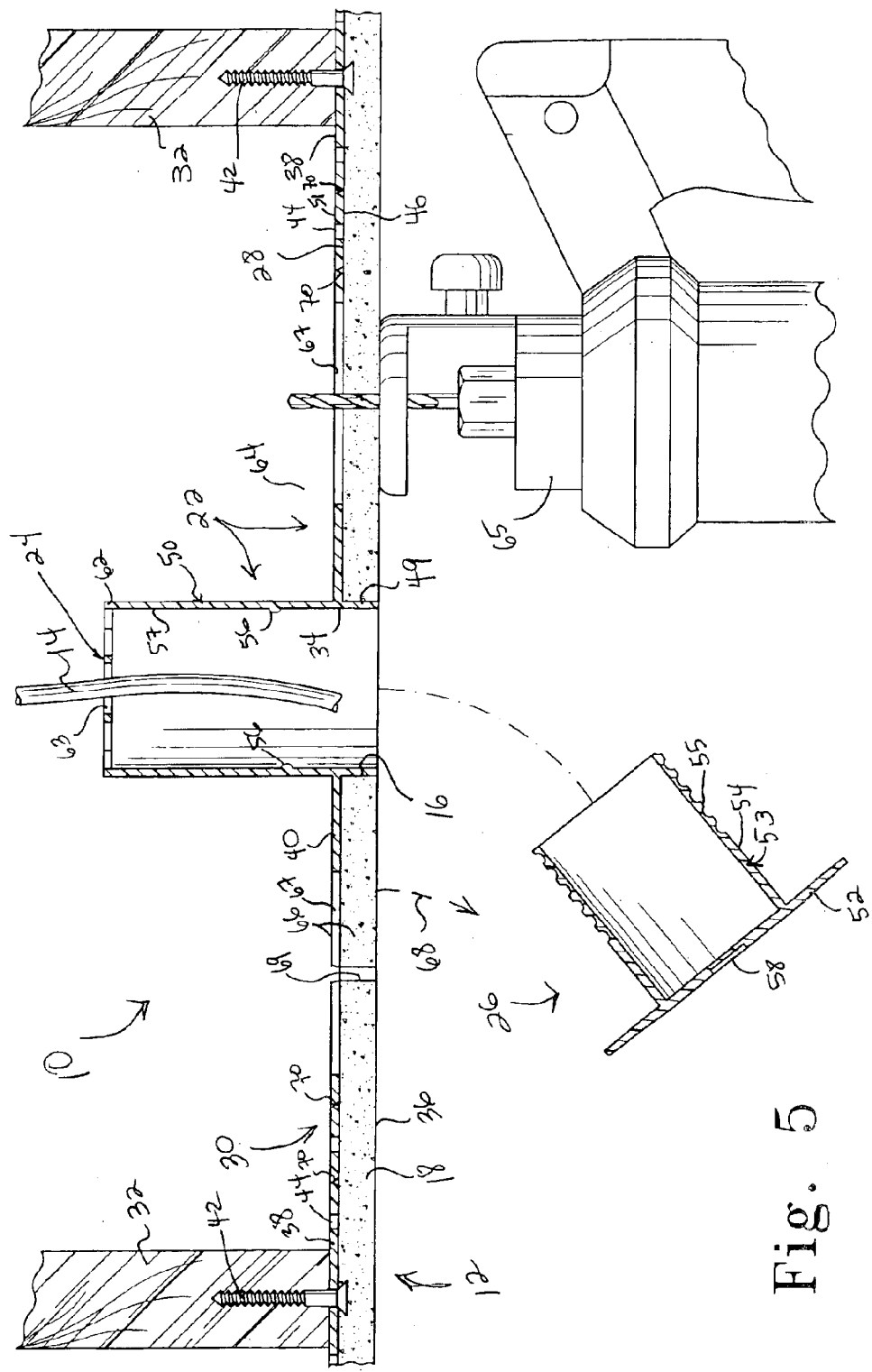
FIG. 5 is a sectional view showing a tool cutting out a portion of the wall and of the wiring installation device for removal of the cut-out portion from a system installation area.

Cover 26 is configured for movement relative to cover support unit 22 between an uncovered position shown, for example, in FIGS. 1 and 5 and a covered position shown, for example, in FIGS. 3 and 4. In the uncovered position, cover 26 uncovers wall hole 16. In the covered position, cover 26 covers the wall hole 16 adjacent a front side 36 of wall 18, extends through wall hole 16 and mount hole 34, and is attached to cover support unit 22 at a location rearward of mount 30.

Attaching cover 26 to cover support unit 22 at a location rearward of mount 30 minimizes the risk that wall texturing media (e.g., "mud") sprayed or otherwise applied onto wall front side 36 will be applied to the surfaces of cover support unit 22 which cooperate with cover 26 for attachment of cover 26 to cover support unit 22. The risk that wall texturing media will interfere with attachment of cover 26 to cover support unit 22 is thereby minimized.

Mount 30 comprises a pair of attachment portions 38 and an intermediate portion 40, as shown, for example, in FIGS. 1–3. A fastener 42 extends through a selected one of several fastener holes 44 formed in each attachment portion 38 to extend into a frame member 32. Fasteners 42 are thus used to attach attachment portions 38 to frame members 32. Mount 30 is configured, for example, as a generally flat, elongated plate.

A front side 46 of mount 30 comprises measurement indicia on attachment portions 38 to indicate which fastener holes 44 to use with frame members 32, as shown, for example, in FIG. 2. Illustratively, front side 46 comprises first measurement indicia 47 and second measurement indicia 48. Indicia 47 indicates that the fastener holes 44 associated therewith are to be used with frame members 32 spaced 16 inches apart on center. Indicia 48 indicates that the fastener holes 44 associated therewith are to be used with frame members 32 spaced 24 inches apart on center.

Cover support unit 22 comprises a positioner sleeve 49 extending in wall hole 16 to position unit 22 relative to wall 18, as shown, for example, in FIG. 4. Positioner sleeve 49 is attached to mount front side 46 at mount hole 34 formed in intermediate portion 40 and extends forwardly from mount front side 46 into wall hole 16.

Cover support unit 22 comprises a cover support 50 for supporting cover 26 in the covered position, as shown, for example, in FIG. 4. Cover support 50 is configured, for example, as a cover support sleeve that is attached to a rear side 51 of mount 30 at mount hole 34 and extends rearwardly from mount rear side 51.

Cover 26 comprises a cap 52 and a coupler 53 for coupling cap 52 to cover support unit 22, as shown, for example, in FIG. 4. Cap 52 is used to cover wall hole 16. Coupler 53 is configured, for example, as a coupler sleeve which extends rearwardly from cap 52 through wall hole 16 and mount hole 34 into cover support sleeve 50 for threaded engagement therewith to couple cover 26 to cover support sleeve 50 when cover 26 is positioned in the covered position. Such threaded engagement between coupler sleeve 53 and cover support sleeve 50 is used to draw cover 26 and cover support unit 22 toward one another to facilitate attachment of cover 26 to cover support unit 22. Illustratively, an outer surface 54 of coupler sleeve 53 is formed to include a thread 55 which engages a pair of spaced-apart bumps 56 formed in an inner surface 57 of cover support sleeve 53.

Cap 52 comprises a tool receiver 58 for receiving a tool 59, as shown, for example, in FIG. 4. Tool receiver 58 is configured, for example, as a recess formed in cap 52. Tool 59 (e.g., screwdriver) fits in tool receiver 58 to rotate cover 26 in an attachment direction 60 to attach cover 26 to cover support unit 22 and to rotate cover 26 in a detachment direction 61 to detach cover 26 from cover support unit 22. Cap 52, coupler sleeve 53, cover support sleeve 50, and mount hole 34 are coaxial relative to an axis 45.

Wiring retainer 24 is attached to cover support sleeve 50, as shown, for example, in FIGS. 1 and 4. Wiring retainer 24 is configured, for example, as a retainer wall that is attached to a rearward end portion 62 of coupler support sleeve 50 and is formed to include a retainer hole 63 for retention of wiring 14 extending therethrough into cover support sleeve 50. Wiring 14 may be tied in a knot to prevent withdrawal of wiring 14 from retainer hole 63. Illustratively, there are a plurality of retainer holes 63 formed in retainer wall 24. Retainer holes 63 may have the same size or may have different sizes to receive wiring of different sizes.

Illustratively, mount 30, positioner sleeve 49, cover support sleeve 50, and wiring retainer 24 cooperate, for example, to form a monolithic unit (i.e., a one-piece construction made of the same material such as, for example, plastic). Illustratively, cap 52 and coupler sleeve 53 cooperate so that cover 26 is a monolithic unit.

Cover 26 is relatively inconspicuous when it is positioned in its covered position. When it is time to install system 20 in facility 12, an installer identifies the location of wiring 14 by identifying the location of cover 26.

System 20 may be mounted in a variety of ways. In one example, system 20 is mounted inside wall 18 in a system installation area 64, as shown, for example, in FIGS. 5–8. In another example, system 20 is mounted outside wall 18 on wall front side 36, as shown, for example, in FIGS. 9 and 10. Each mounting example is discussed in turn.

With respect to the first system mounting example, after cover 26 is removed from cover support unit 22 and wiring 14 is untied, an installer uses a cutting tool 65 (e.g., a roto-zip) to enlarge wall hole 16 so that system 20 can be received through wall 18, as shown, for example, in FIG. 5. Cutting tool 65 is used to cut all the way around wall hole 16 and through intermediate portion 40 of mount 30. Intermediate portion 40 comprises a pair of tool holes 67 which are larger than fastener holes 44 and are positioned to opposite sides of mount hole 34. Tool holes 67 are configured for movement of cutting tool 65 therethrough to lessen the amount of material of mount 30 to be cut by cutting tool 65. The first cut-out portion 66 of wall 18 and wiring installation device 10 is then removed from system installation area 64 in a direction 68 thereby leaving a first enlarged wall hole 69.

If first enlarged wall hole 69 is large enough to receive system 20, system 20 can be installed without further cutting of wall 18. However, if wall hole 69 is not large enough, the installer first removes more material from what remains of mount 30, as shown, for example, in FIG. 6, and then cuts more material from wall 18, as shown, for example, in FIG. 7, before installing system 20 in system installation area 64, as shown, for example, in FIG. 8.

Figure 6:
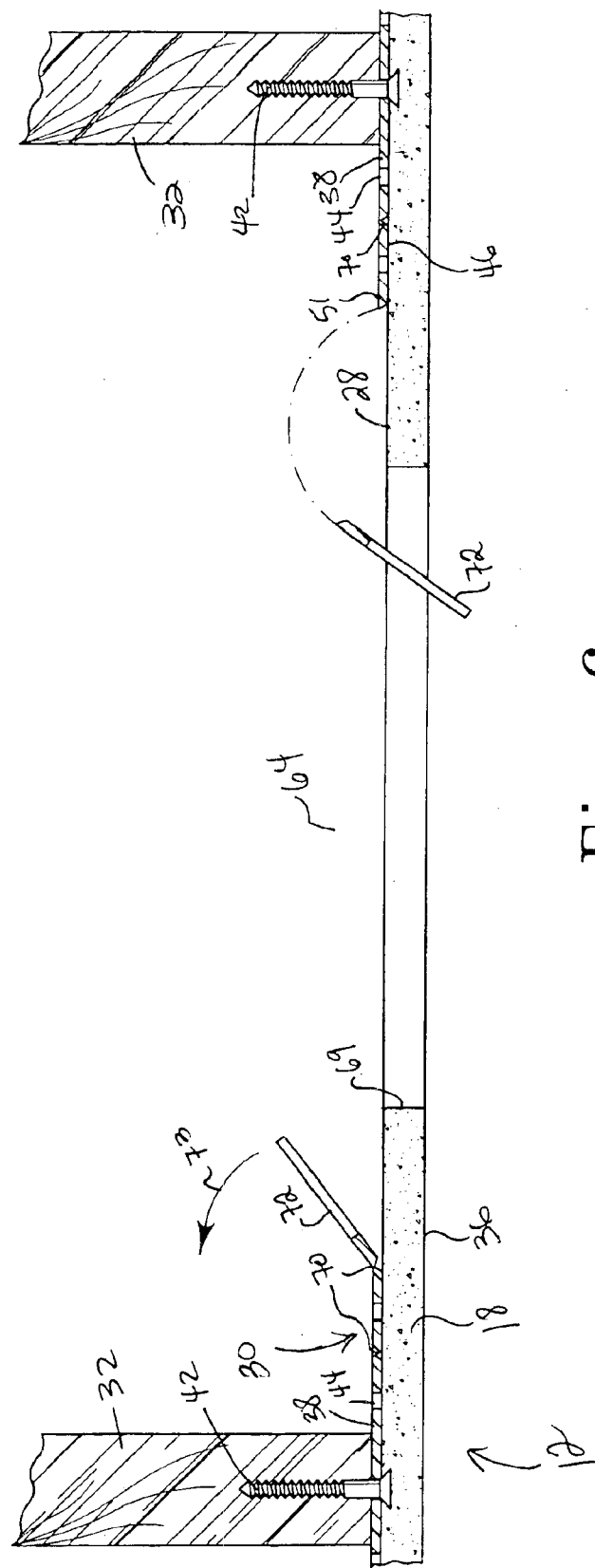
FIG. 6 is a sectional view showing breaking and removal of portions of the first wiring installation device.
Figure 7:
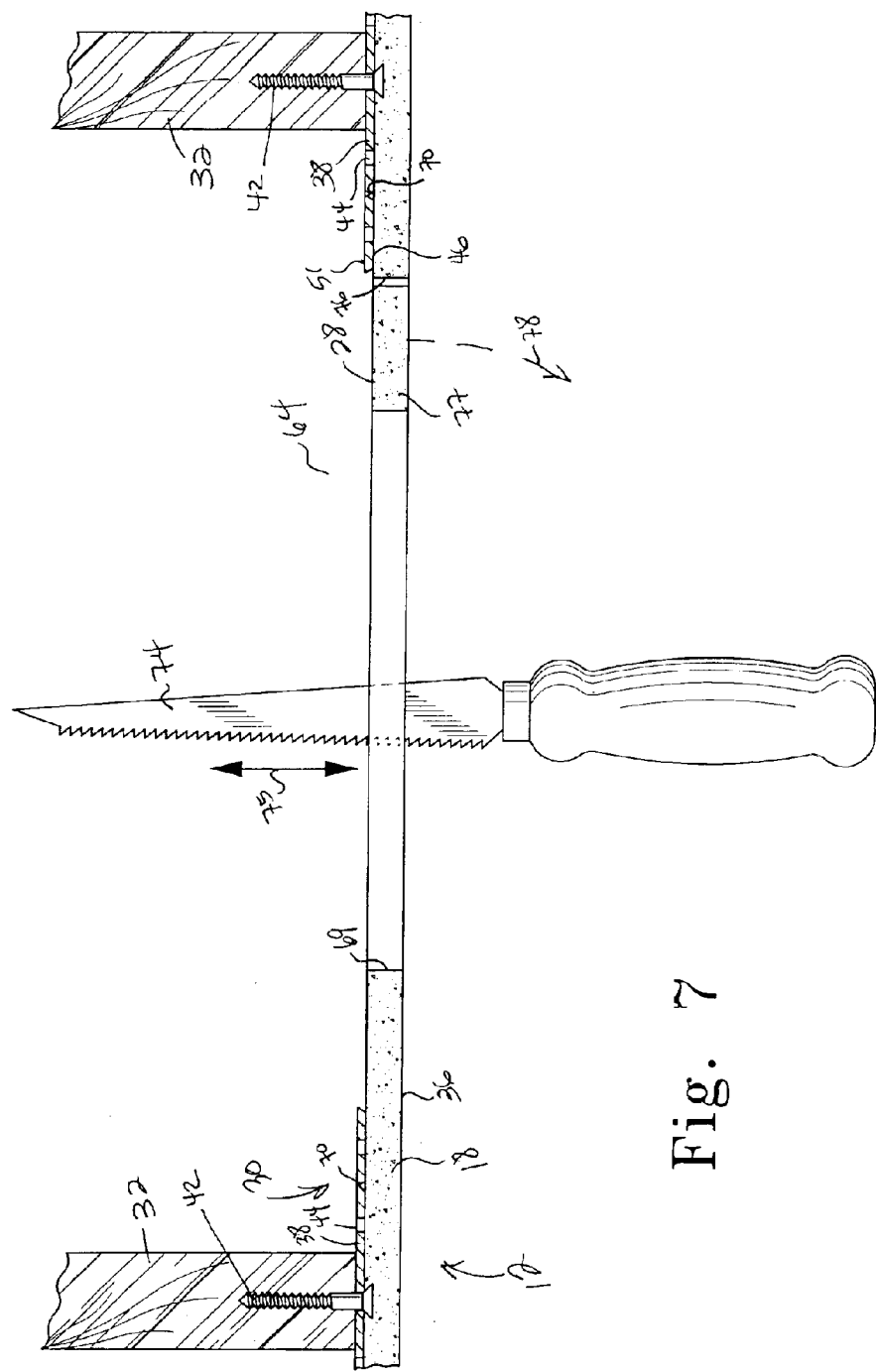
FIG. 7 is a sectional view showing another tool cutting out a larger portion of the wall for removal from the system installation area.

Mount 30 comprises a number of frangible portions 70, as shown, for example, in FIGS. 1, 2, and 6. Each frangible portion 70 is, for example, a groove that has a reduced thickness relative to adjacent portions of mount 30 and is recessed from mount front side 46 toward mount rear side 51. Frangible portions 70 extend laterally between longitudinal edges 71 of mount 30 in perpendicular relation thereto. Frangible portions 70 allow remaining pieces 72 of intermediate portion 40 to be moved in breaking direction 73 so that pieces 72 can be broken away from attachment portions 38 and removed from system installation area 64. Wall hole 69 can then be enlarged without additional cutting of mount 30. Mount 30 is formed to include, for example, six frangible portions 70, three to each side of mount hole 34.

After pieces 72 are removed from system installation area 64, a cutting tool 74 is moved in cutting directions 75 to enlarge wall hole 69. The installer uses cutting tool 74 to cut around wall hole 69 to cut out a second cut-out portion 77.

Second cut-out portion 77 is then removed from system installation area 64 in a direction 78 to provide a second enlarged wall hole 76 large enough to receive system 20.

Figure 8:
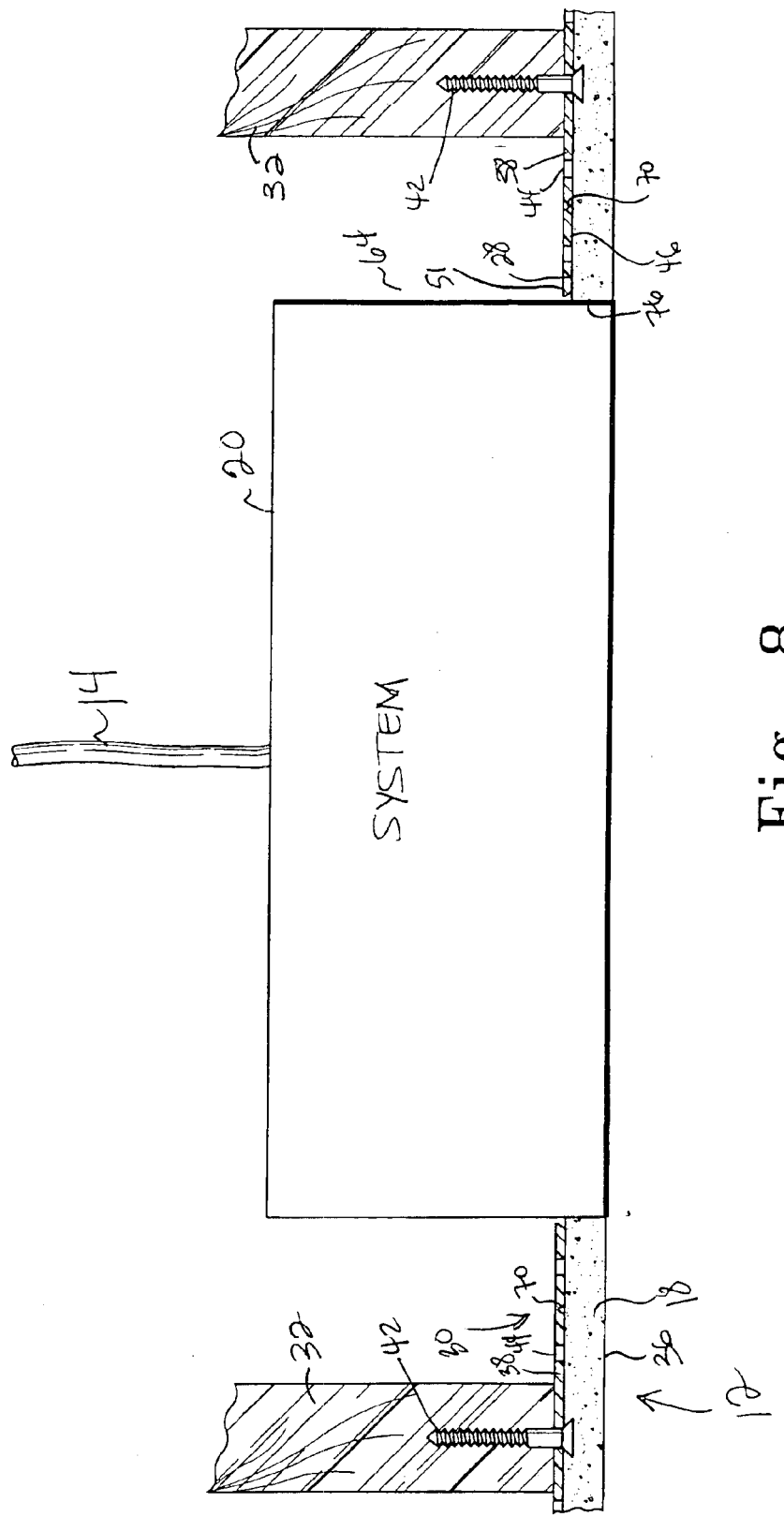
FIG. 8 is a sectional view showing the system mounted in the system installation area and attached to the wiring to receive a service therefrom.

After removal of second cut-out portion 77, system 20 is positioned in second enlarged wall hole 76 and installed in system installation area 64 and wiring 14 is attached to system 20 to provide a service thereto, as shown, for example, in FIG. 8.

Figure 9:
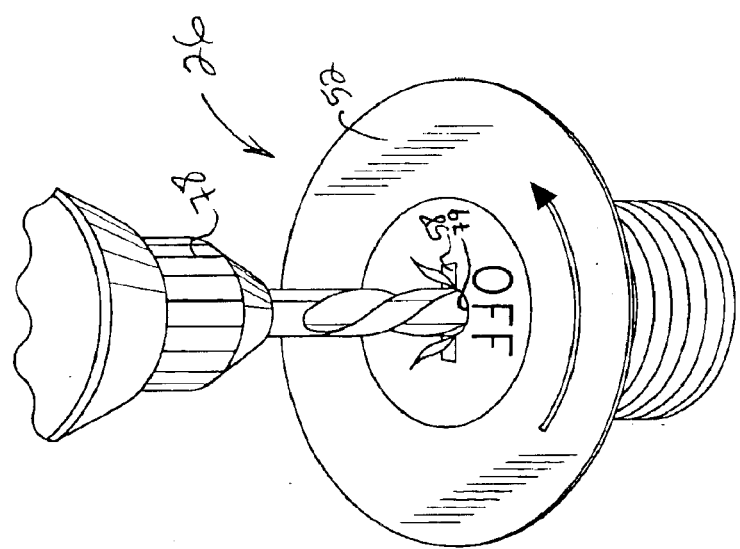
FIG. 9 is a perspective view shows use of a tool to create a hole in a cover of the first wiring installation device.

With respect to the second system mounting example, cover 26 is removed from cover support unit 22 and a cutting tool 78 (e.g., drill) is used to drill a cap hole 79 in cap 52, as shown, for example, in FIG. 9. Wiring 14 is untied and fed through cap hole 79.

Figure 10:
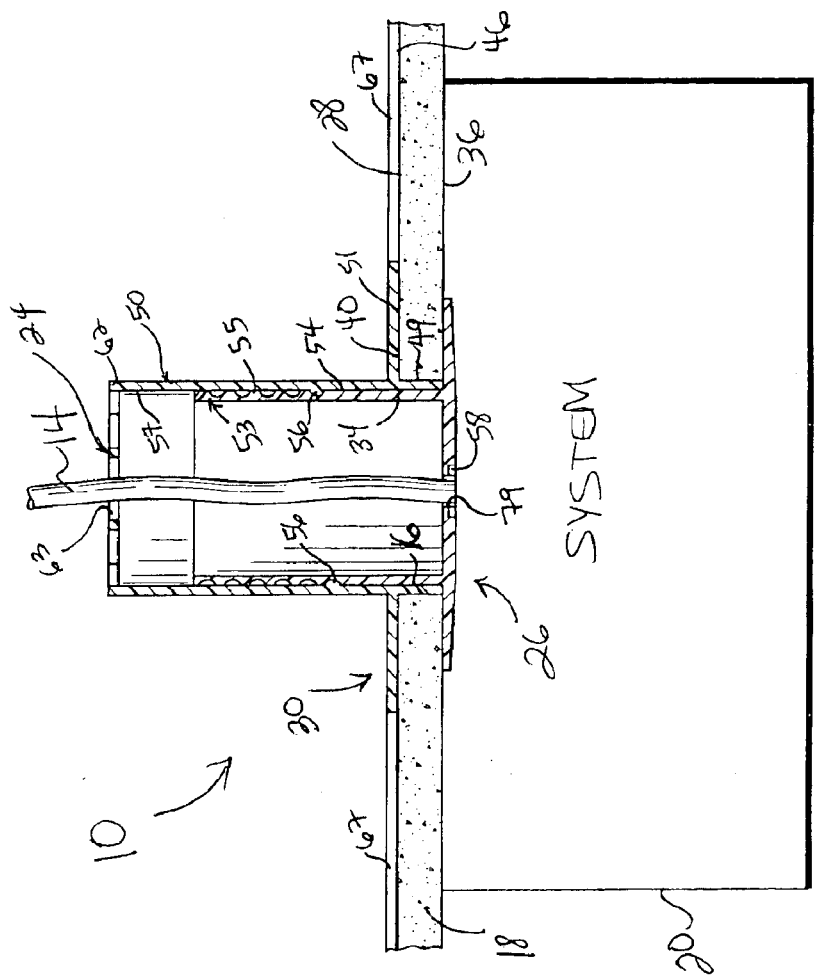
FIG. 10 is a sectional view showing extension of the wiring in the hole formed in the cover and attachment of the wiring to a wall-mounted system to provide a service thereto.

Cover 26 is then re-attached to cover support unit 22 so that it assumes its covered position, as shown, for example, in FIG. 10. Wiring 14 is attached to system 20 and system 20 is attached to wall 18.

Figure 11:
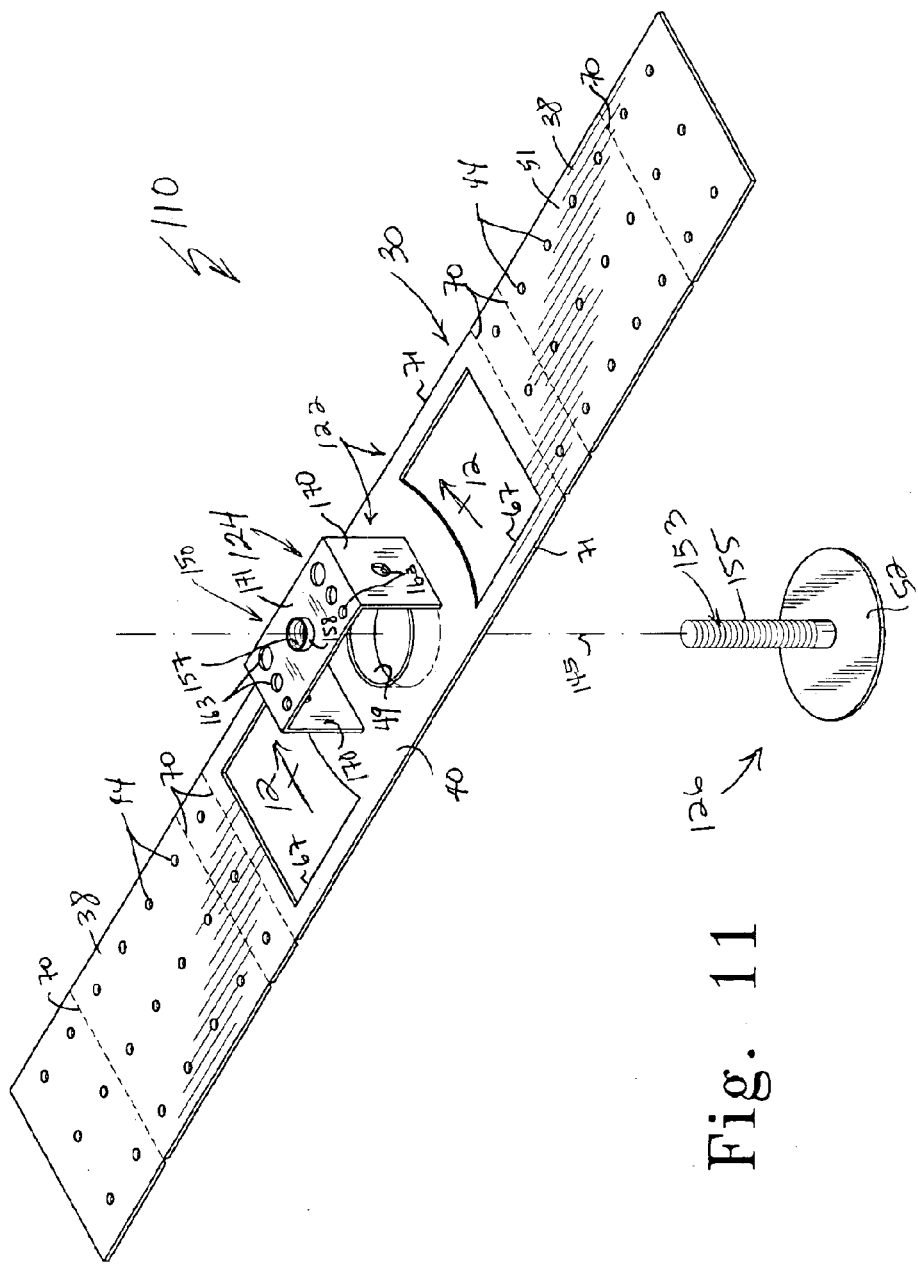
FIG. 11 is a perspective view of a second wiring installation device.
Figure 12:
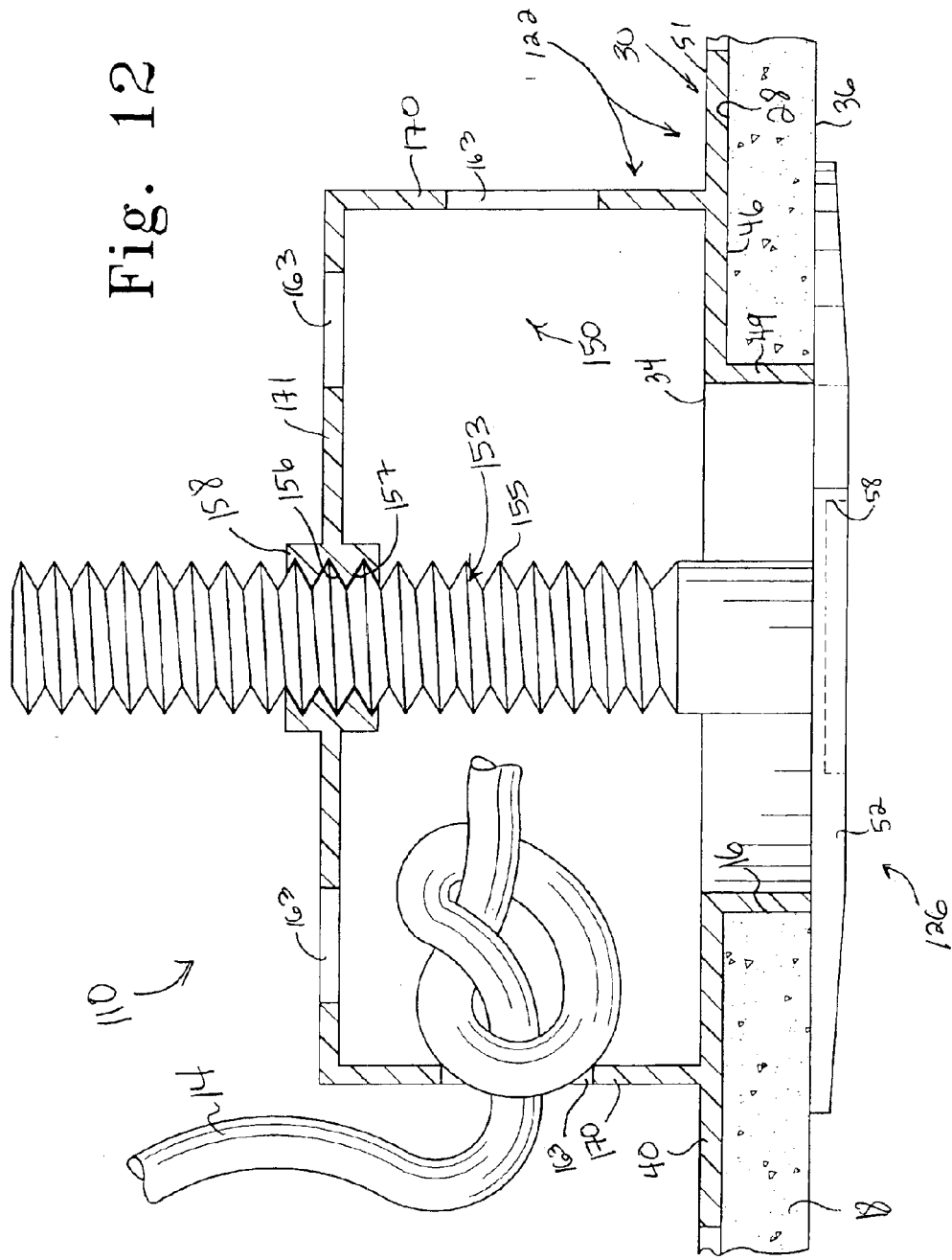
FIG. 12 is a sectional view taken along lines 12—12 of FIG. 11.

A second wiring installation device 110 for use in "pre-wiring" a facility 12 is shown, for example, in FIGS. 11 and 12. Device 110 is used to retain wiring 14 adjacent wall hole 16 to facilitate subsequent identification of the location of wiring 14 in facility 12 for attachment of wiring 14 to system 20 to provide a service thereto.

Device 110 includes components which are similar in structure and function to components already described. As such, identical reference numbers are used in connection with those similar components.

Device 110 comprises a cover support unit 122, a wiring retainer 124, and a cover 126 as shown, for example, in FIGS. 11 and 12. Cover support unit 122 extends behind wall rear side 28 and comprises mount 30. Wiring retainer 124 is used to retain wiring 14 adjacent wall hole 16 and is attached, for example, to cover support unit 122.

Cover 126 is configured for movement relative to cover support unit 122 between an uncovered position shown, for example, in FIG. 11 and a covered position shown, for example, in FIG. 12. In the uncovered position, cover 126 uncovers wall hole 16. In the covered position, cover 126 covers the wall hole 16 adjacent wall front side 36, extends through wall hole 16 and mount hole 34, and is attached to cover support unit 122 at a location rearward of mount 30.

Attaching cover 126 to cover support unit 122 at a location rearward of mount 30 minimizes the risk that wall texturing media sprayed or otherwise applied onto wall front side 36 will be applied to the surfaces of cover support unit 122 which cooperate with cover 126 for attachment of cover 126 to cover support unit 122. The risk that wall texturing media will interfere with attachment of cover 126 to cover support unit 122 is thereby minimized.

Cover support unit 122 comprises a cover support 150 for supporting cover 126 in the covered position, as shown, for example, in FIGS. 11 and 12. Cover support 150 is configured, for example, as a cover support plate that extends across and rearward of mount hole 34 and is attached to mount rear side 51 at locations that are spaced outwardly from and to opposite sides of mount hole 34.

Cover support plate 150 comprises spaced-apart first and second side walls 170 and a connector wall 171, as shown, for example, in FIGS. 11 and 12. Side walls 170 face one another and are attached to and extend rearwardly from mount rear side 51 at locations that are spaced outwardly from and to opposite sides of mount hole 34. Connector wall 171 is attached to and interconnects side walls 170 and extends across mount hole 34.

Cover 126 comprises cap 52 and a coupler 153 for coupling cap 52 to cover support unit 122 to cover wall hole 16, as shown, for example, in FIG. 12. Coupler 153 is configured, for example, as a post that is attached to cap 52 and extends through wall hole 16 and mount hole 34 and into a coupler hole 157 provided by a sleeve 158 of connector wall 171 for threaded engagement between a thread 155 of post 153 and a thread 156 of a coupler hole 157. Such threaded engagement between post 153 and cover support plate 150 is used to draw cover 126 and cover support unit 122 toward one another to facilitate attachment of cover 126 to cover support unit 122. Cap 52, coupler 153, mount hole 34, and coupler hole 157 are coaxial relative to an axis 145.

Wiring retainer 124 comprises at least one retainer hole 163 formed in cover support plate 150, as shown, for example, in FIGS. 11 and 12. Retainer hole 163 is used to retain wiring 14 extending therethrough. Illustratively, there is a retainer hole 163 formed in each side wall 170 and a plurality of retainer holes 163 formed in connector wall 171 to opposite sides of coupler hole 157. Retainer holes 163 may have the same size or may have different sizes to receive wiring of different sizes.

Illustratively, mount 30, positioner sleeve 49, cover support plate 150, and wiring retainer 124 cooperate to form a monolithic unit. Illustratively, cap 52 and post 153 cooperate so that cover 126 is a monolithic unit.

Figure 13:
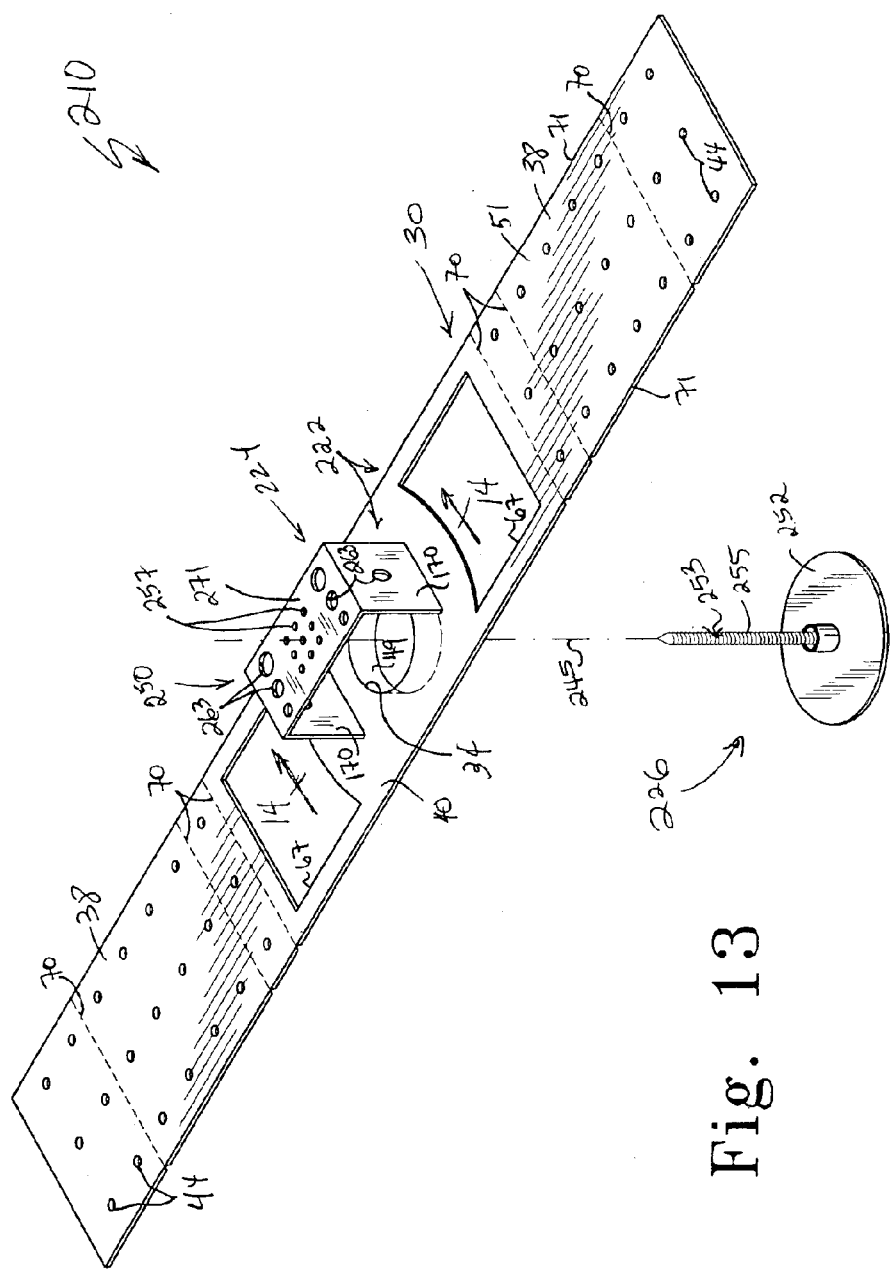
FIG. 13 is a perspective view of a third wiring installation device.
Figure 14:
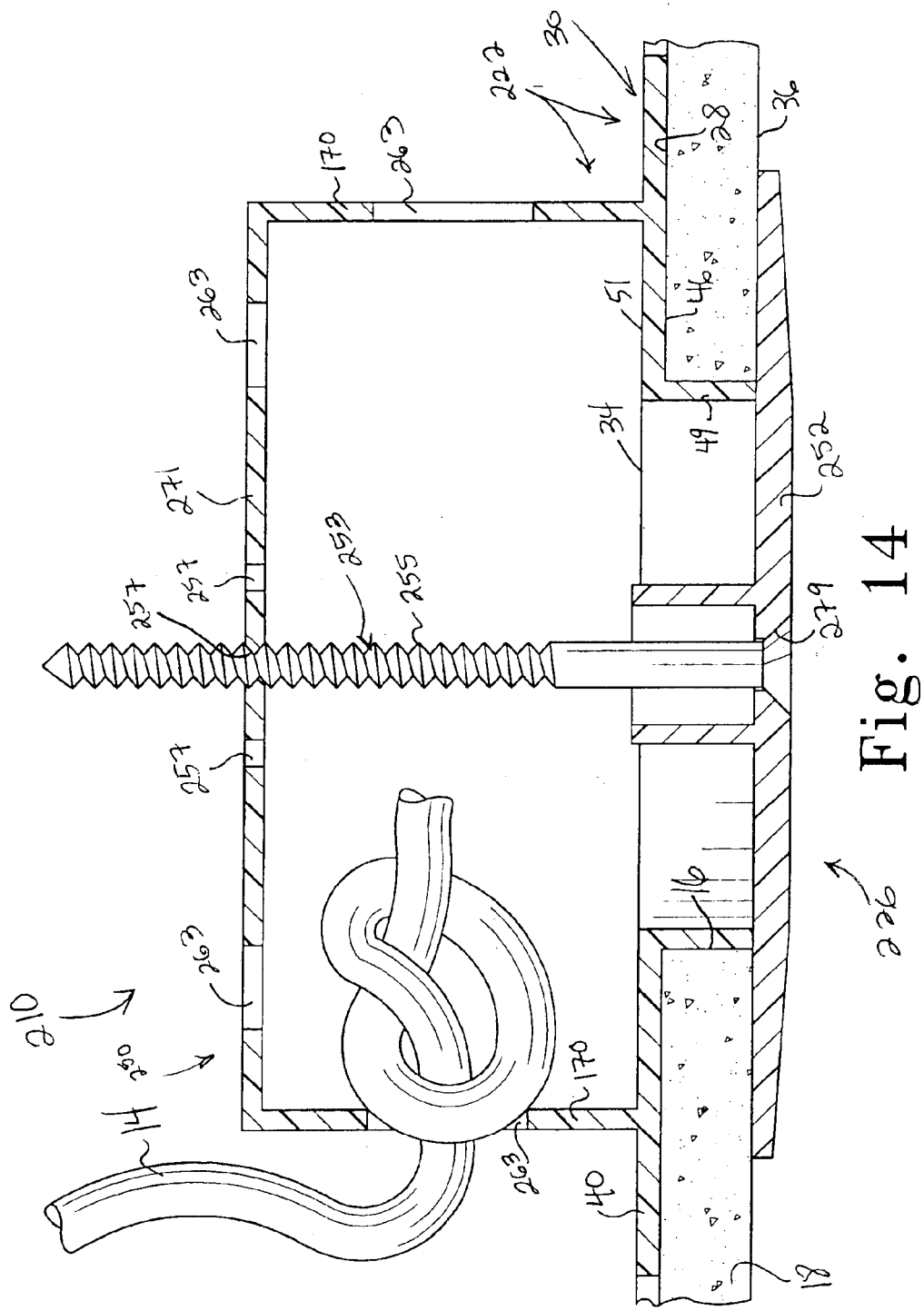
FIG. 14 is a sectional view taken along lines 14—14 of FIG. 13.

A third wiring installation device 210 for use in "pre-wiring" a facility 12 is shown, for example, in FIGS. 13 and 14. Device 210 is used to retain wiring 14 adjacent wall hole 16 to facilitate subsequent identification of the location of wiring 14 in facility 12 for attachment of wiring 14 to system 20 to provide a service thereto.

Device 210 includes components which are similar in structure and function to components already described. As such, identical reference numbers are used in connection with those similar components.

Device 210 comprises a cover support unit 222, a wiring retainer 224, and a cover 226 as shown, for example, in FIGS. 13 and 14. Cover support unit 222 extends behind wall rear side 28 and comprises mount 30. Wiring retainer 224 is used to retain wiring 14 adjacent wall hole 16 and is attached, for example, to cover support unit 222.

Cover 226 is configured for movement relative to cover support unit 222 between an uncovered position shown, for example, in FIG. 13 and a covered position shown, for example, in FIG. 14. In the uncovered position, cover 226 uncovers wall hole 16. In the covered position, cover 226 covers the wall hole 16 adjacent wall front side 36, extends through wall hole 16 and mount hole 34, and is attached to cover support unit 222 at a location rearward of mount 30.

Attaching cover 226 to cover support unit 222 at a location rearward of mount 30 minimizes the risk that wall texturing media sprayed or otherwise applied onto wall front side 36 will be applied to the surfaces of cover support unit 222 which cooperate with cover 226 for attachment of cover 226 to cover support unit 222. The risk that wall texturing media will interfere with attachment of cover 226 to cover support unit 222 is thereby minimized.

Cover support unit 222 comprises a cover support 250 for supporting cover 226 in the covered position, as shown, for example, in FIGS. 13 and 14. Cover support 250 is configured, for example, as a cover support plate that extends across and rearward of mount hole 34 and is attached to mount rear side 51 at locations that are spaced outwardly from and to opposite sides of mount hole 34.

Cover support plate 250 is similar to cover support plate 150 except for the construction of a connector wall 271 which is attached to and interconnects side walls 170 and extends across mount hole 34, as shown, for example, in FIGS. 13 and 14. Connector wall 271 comprises a plurality of coupler holes 257 that are relatively close to one another to receive a coupler 253 of cover 226 through one of coupler holes 257.

Cover 226 comprises a cap 252 and coupler 253 for coupling cap 252 to cover support unit 222 to cover wall hole 16, as shown, for example, in FIG. 14. Coupler 253 is configured, for example, as a screw that extends through a cap hole 279 formed in cap 252, wall hole 16, mount hole 34, and one of coupler holes 257 for threaded engagement therewith by a thread 255 of screw 253. Such threaded engagement between screw 253 and cover support plate 250 is used to draw cover 226 and cover support unit 222 toward one another to facilitate attachment of cover 226 to cover support unit 222. Cap 252, coupler 253, and mount hole 34 are coaxial relative to an axis 245.

Wiring retainer 224 comprises at least one retainer hole 263 formed in cover support plate 250, as shown, for example, in FIGS. 13 and 14. Retainer hole 263 is used to retain wiring 14 extending therethrough. Illustratively, there is a retainer hole 263 formed in each side wall 170 and a plurality of retainer holes 263 formed in connector wall 271 to opposite sides of coupler holes 257. Retainer holes 263 may have the same size or may have different sizes to receive wiring of different sizes.

Illustratively, mount 30, positioner sleeve 49, cover support plate 250, and wiring retainer 224 cooperate to form a monolithic unit.

Figure 15:
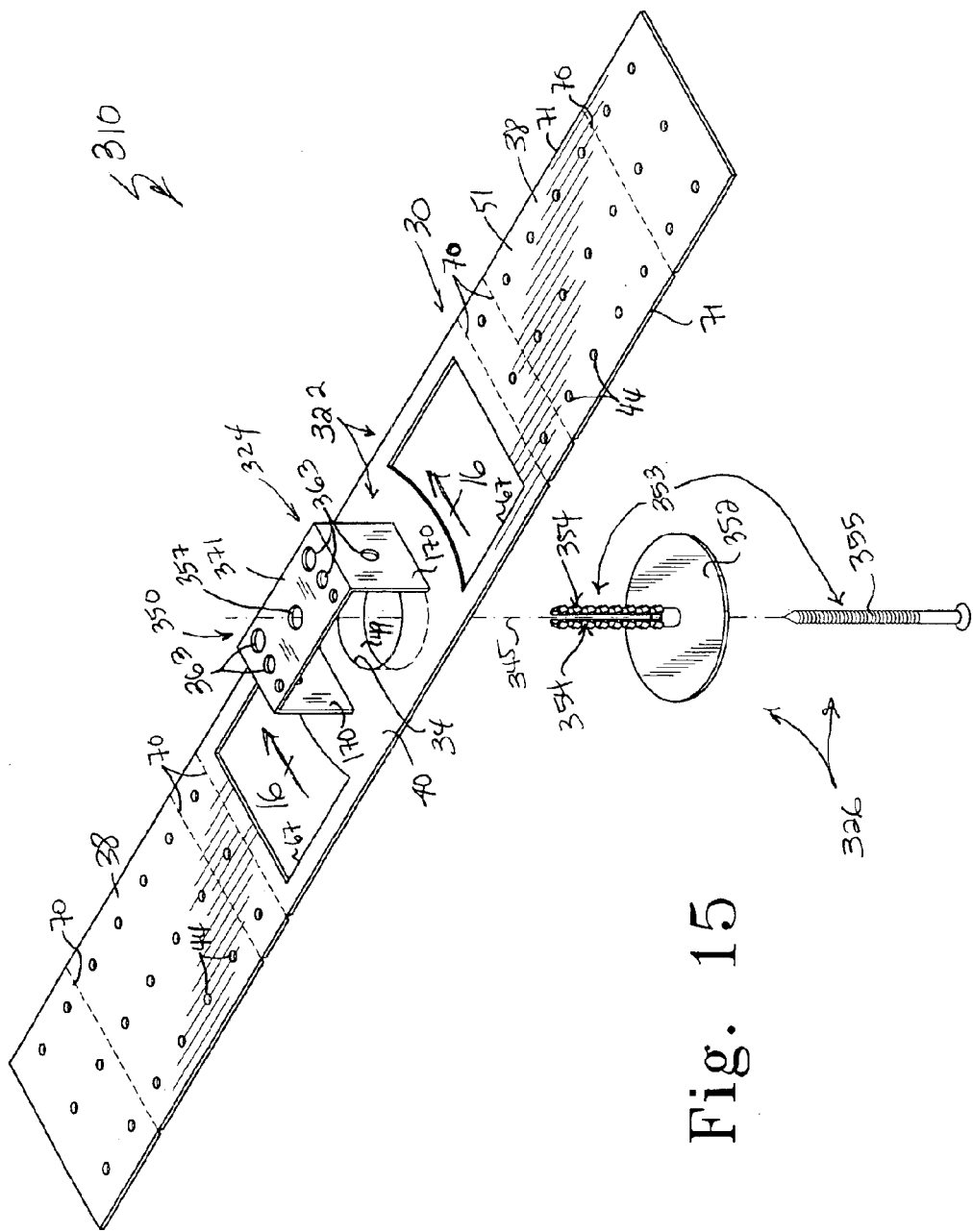
FIG. 15 is a perspective view of a fourth wiring installation device.
Figure 16:
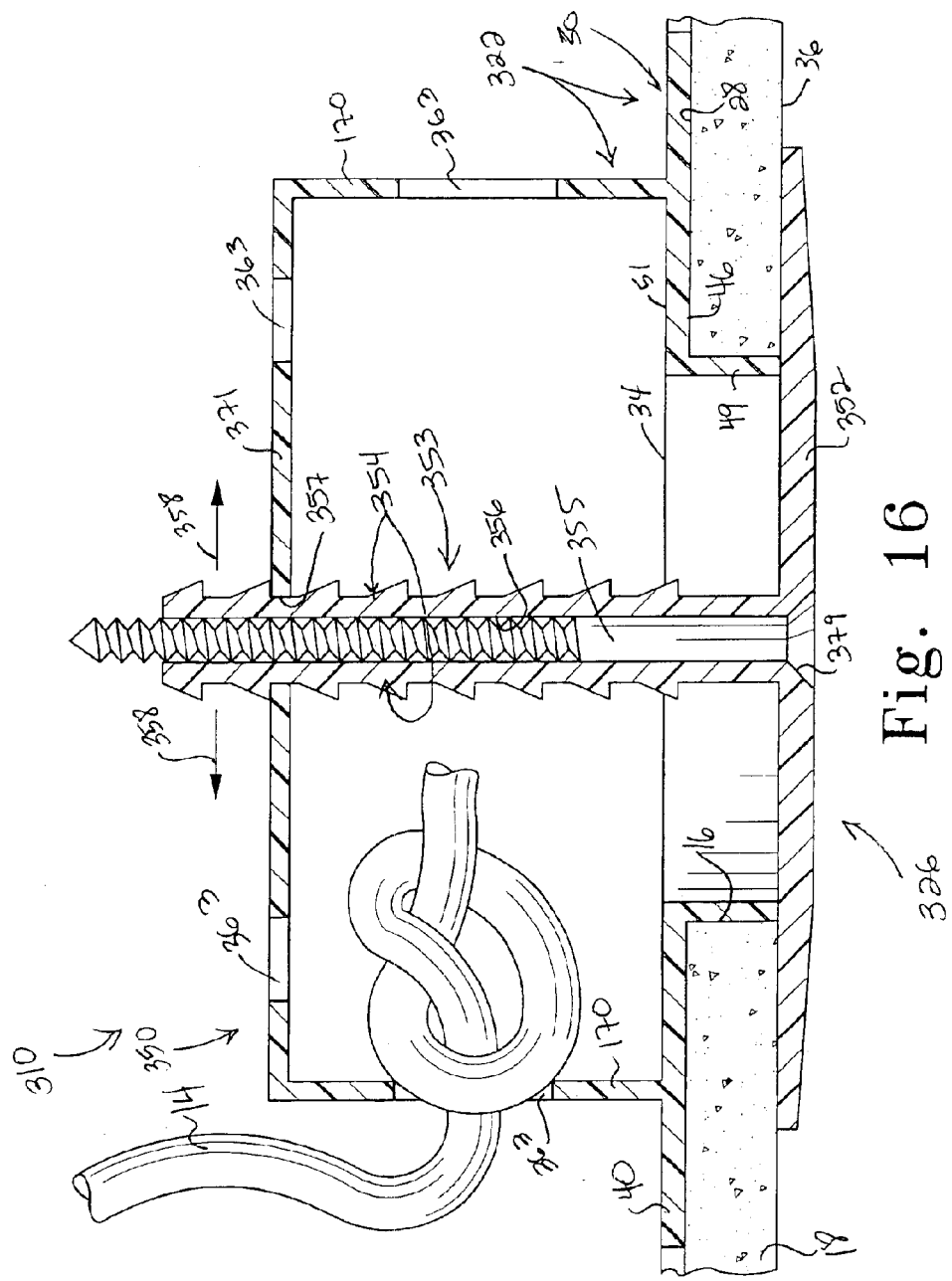
FIG. 16 is a sectional view taken along lines 16—16 of FIG. 15.

A fourth wiring installation device 310 for use in "pre-wiring" a facility 12 is shown, for example, in FIGS. 15 and 16. Device 310 is used to retain wiring 14 adjacent wall hole 16 to facilitate subsequent identification of the location of wiring 14 in facility 12 for attachment of wiring 14 to system 20 to provide a service thereto.

Device 310 includes components which are similar in structure and function to components already described. As such, identical reference numbers are used in connection with those similar components.

Device 310 comprises a cover support unit 322, a wiring retainer 324, and a cover 326 as shown, for example, in FIGS. 15 and 16. Cover support unit 322 extends behind wall rear side 28 and comprises mount 30. Wiring retainer 324 is used to retain wiring 14 adjacent wall hole 16 and is attached, for example, to cover support unit 322.

Cover 326 is configured for movement relative to cover support unit 322 between an uncovered position shown, for example, in FIG. 15 and a covered position shown, for example, in FIG. 16. In the uncovered position, cover 326 uncovers wall hole 16. In the covered position, cover 326 covers the wall hole 16 adjacent wall front side 36, extends through wall hole 16 and mount hole 34, and is attached to cover support unit 322 at a location rearward of mount 30.

Attaching cover 326 to cover support unit 322 at a location rearward of mount 30 minimizes the risk that wall texturing media sprayed or otherwise applied onto wall front side 36 will be applied to the surfaces of cover support unit 322 which cooperate with cover 326 for attachment of cover 326 to cover support unit 322. The risk that wall texturing media will interfere with attachment of cover 326 to cover support unit 322 is thereby minimized.

Cover support unit 322 comprises a cover support 350 for supporting cover 326 in the covered position, as shown, for example, in FIGS. 15 and 16. Cover support 350 is configured, for example, as a cover support plate that extends across and rearward of mount hole 34 and is attached to mount rear side 51 at locations that are spaced outwardly from and to opposite sides of mount hole 34.

Cover support plate 350 is similar to cover support plates 150 and 250 except for the construction of a connector wall 371 which is attached to and interconnects side walls 170 and extends across mount hole 34, as shown, for example, in FIGS. 15 and 16. Connector wall 371 comprises a coupler hole 357 to receive therethrough a component of a coupler 353 of cover 326.

Cover 326 comprises a cap 352 and a coupler 353 for coupling cap 352 to cover support unit 322 to cover wall hole 16, as shown, for example, in FIG. 16. Coupler 353 comprises a plurality (e.g., four) of fingers 354 attached to cap 352 and normally biased inwardly toward one another and a finger mover 355 configured, for example, as a post which may or may not be threaded. Fingers 354 are normally biased inwardly toward one another to facilitate insertion of fingers 354 through coupler hole 357 and avoid causing too much rearward flexure of cover support unit 322. After fingers 354 are inserted through coupler hole 357, finger mover 355 is inserted through a cap hole 379 formed in cap 352 into a space 356 between fingers 354 to engage and cause fingers 354 to move outwardly away from one another, as indicated by outward direction arrows 358 in FIG. 16. Such outward movement of fingers 354 causes lugs 359 of fingers 354 to engage connector wall 371 to thereby attach cover 326 to cover support unit 322. Cap 352, coupler 353, mount hole 34, and coupler hole 357 are coaxial relative to an axis 345.

Wiring retainer 324 comprises at least one retainer hole 363 formed in cover support plate 350, as shown, for example, in FIGS. 15 and 16. Retainer hole 363 is used to retain wiring 14 extending therethrough. Illustratively, there is a retainer hole 363 formed in each side wall 170 and a plurality of retainer holes 363 formed in connector wall 371 to opposite sides of coupler hole 357. Retainer holes 363 may have the same size or may have different sizes to receive wiring of different sizes.

Illustratively, mount 30, positioner sleeve 49, cover support plate 350, and wiring retainer 324 cooperate to form a monolithic unit.

Figure 17:
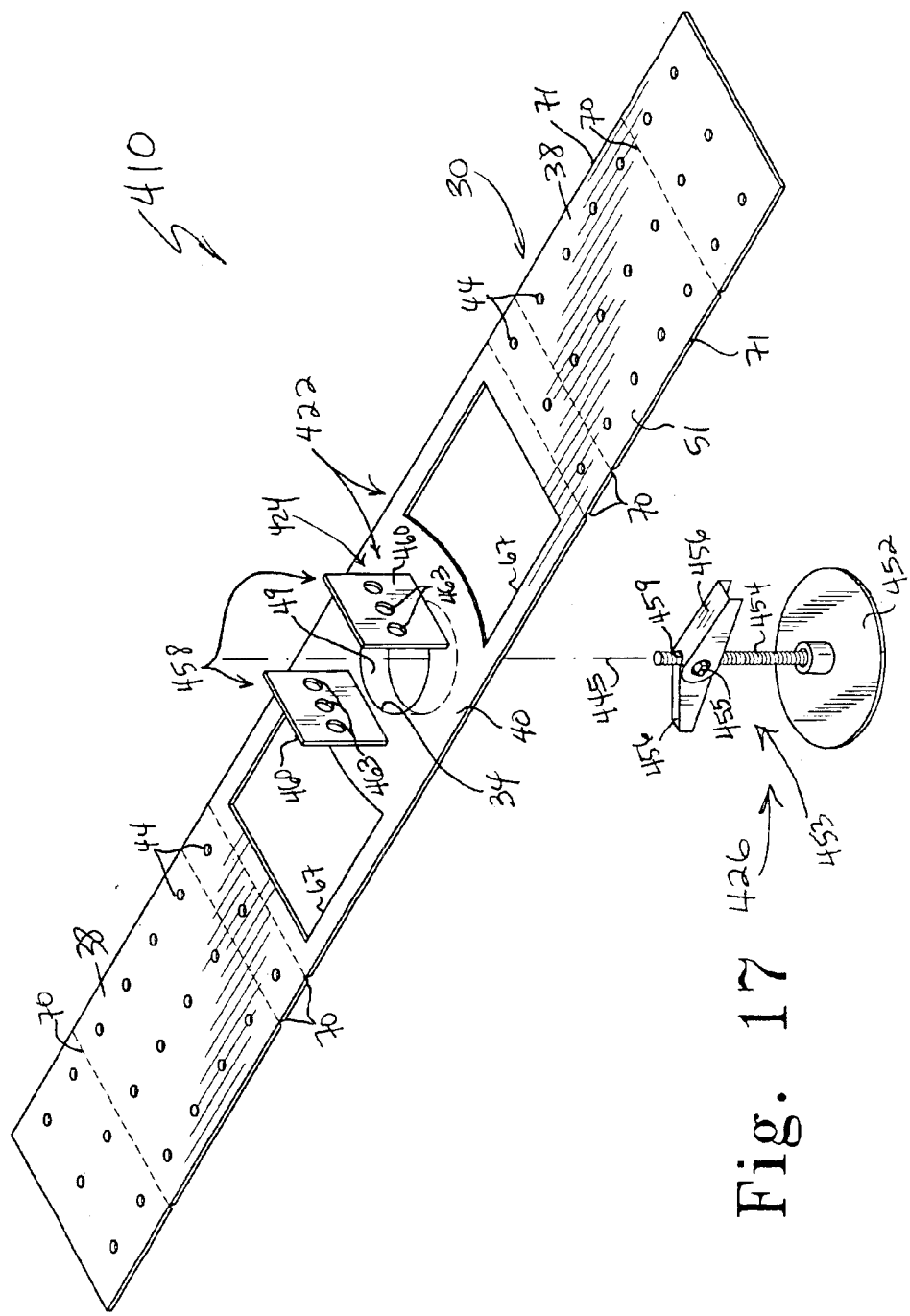
FIG. 17 is a perspective view of a fifth wiring installation device.
Figure 18:
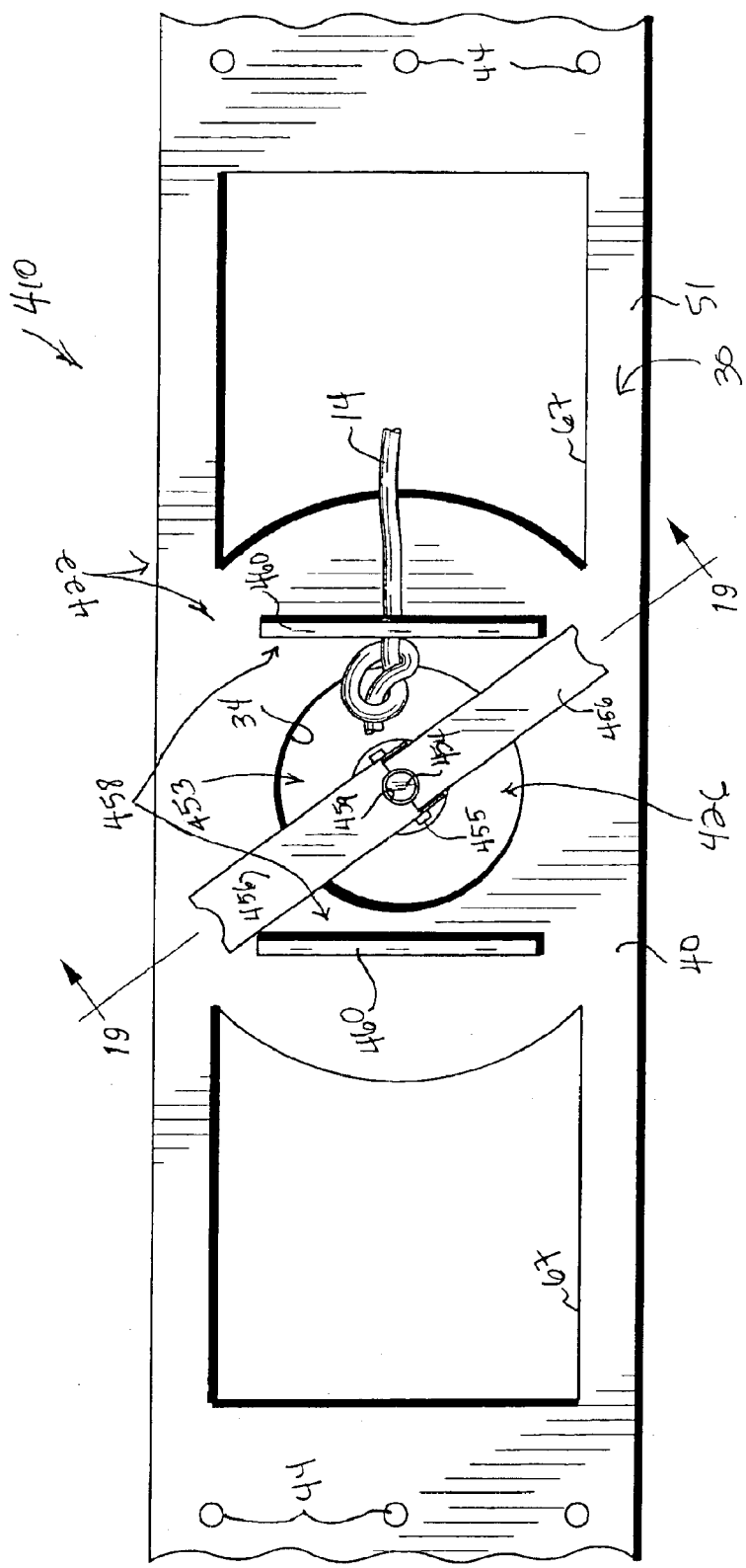
FIG. 18 is a plan view of the fifth wiring installation device.
Figure 19:
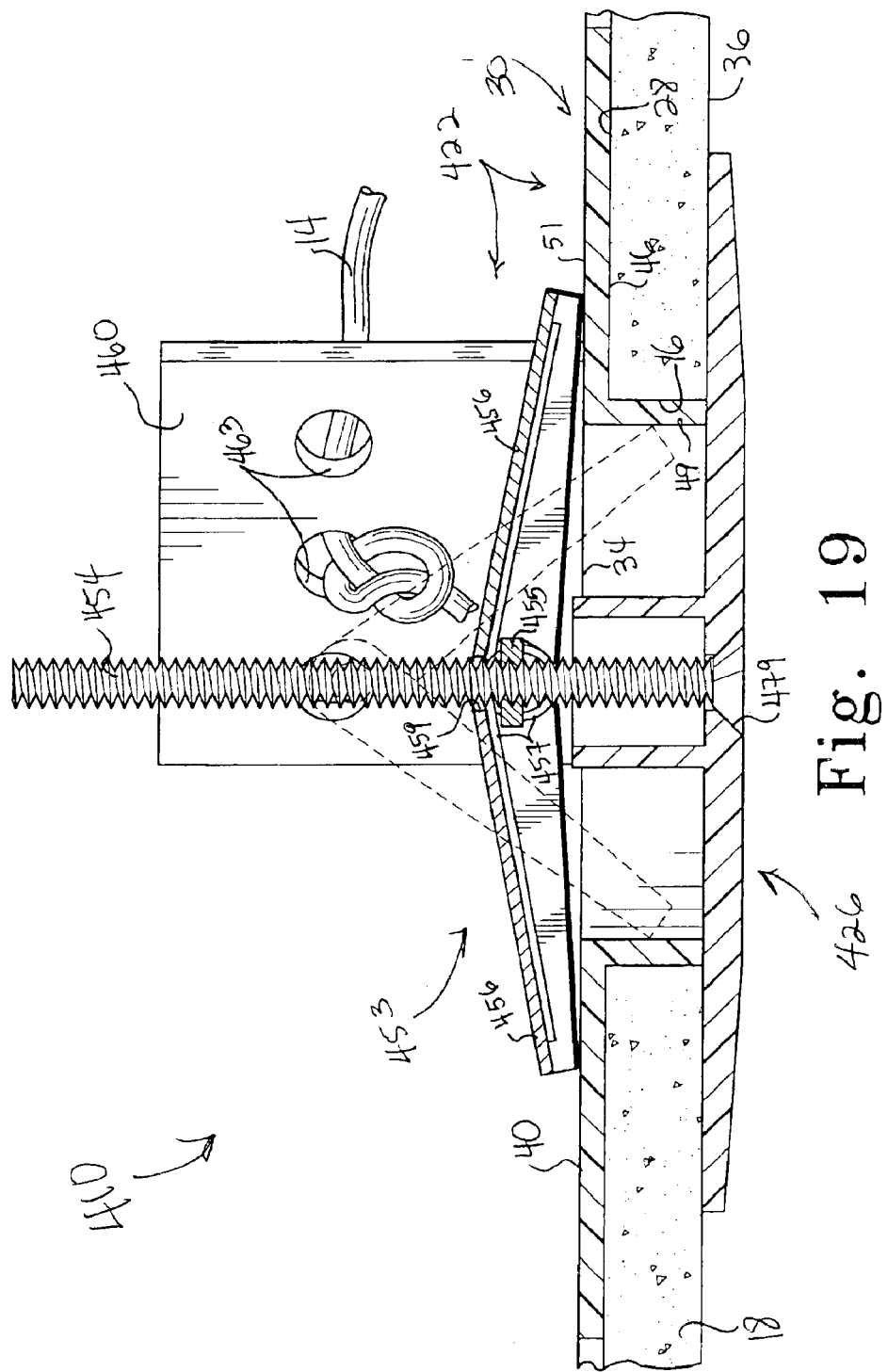
FIG. 19 is a sectional view taken along lines 19—19 of FIG. 18.

A fifth wiring installation device 410 for use in "pre-wiring" a facility 12 is shown, for example, in FIGS. 17–19. Device 410 is used to retain wiring 14 adjacent wall hole 16 to facilitate subsequent identification of the location of wiring 14 in facility 12 for attachment of wiring 14 to system 20 to provide a service thereto.

Device 410 includes components which are similar in structure and function to components already described. As such, identical reference numbers are used in connection with those similar components.

Device 410 comprises a cover support unit 422, a wiring retainer 424, and a cover 426 as shown, for example, in FIGS. 17-19. Cover support unit 422 extends behind wall rear side 28 and comprises mount 30. Wiring retainer 424 is used to retain wiring 14 adjacent wall hole 16 and is attached, for example, to cover support unit 422.

Cover 426 is configured for movement relative to cover support unit 422 between an uncovered position shown, for example, in FIG. 17 and a covered position shown, for example, in FIGS. 18 and 19. In the uncovered position, cover 426 uncovers wall hole 16. In the covered position, cover 426 covers the wall hole 16 adjacent wall front side 36, extends through wall hole 16 and mount hole 34, and is attached to cover support unit 422 at a location rearward of mount 30.

Attaching cover 426 to cover support unit 422 at a location rearward of mount 30 minimizes the risk that wall texturing media sprayed or otherwise applied onto wall front side 36 will be applied to the surfaces of cover support unit 422 which cooperate with cover 426 for attachment of cover 426 to cover support unit 422. The risk that wall texturing media will interfere with attachment of cover 326 to cover support unit 422 is thereby minimized.

Cover 426 comprises a cap 452 and a coupler 453 for coupling cap 452 to cover support unit 422 to cover wall hole 16, as shown, for example, in FIG. 19. Coupler 453 comprises a screw 454 to extend through a cap hole 479 formed in cap 452, wall hole 16, and mount hole 34, a nut 455 for threaded engagement with screw 454, a pair of relatively movable flanges 456 attached to nut 455, and a spring 457 (e.g., torsion spring). Cap 452, coupler 453, and mount hole 34 are coaxial relative to an axis 445.

Spring 457 engages flanges 456 to move flanges 456 relative to one another from a collapsed position to an extended position. In the collapsed position, flanges 456 are allowed to move through wall hole 16 and mount hole 34, as suggested, for example, by the phantom lines in FIG. 19. Once flanges 456 clear mount hole 34, spring 457 moves flanges 456 outwardly to the extended position. In the extended position, at least one of flanges 456 is configured to engage a rotation blocker 458 of cover support unit 422. Rotation blocker 458 blocks rotation of flanges 456 upon rotation of screw 454 to allow screw 454 to be threaded through nut 455 and to move through an aperture 459 formed between flanges 456 to cause engagement between flanges 456 and mount rear side 51 to attach cover 426 to cover support unit 422.

Rotation blocker 458 comprises a pair of spaced-apart rotation blocker walls 460, as shown, for example, in FIGS. 17–19. Walls 460 are attached to and extend rearwardly from mount rear side 51. Walls 460 are positioned to opposite sides of mount hole 34.

Wiring retainer 424 comprises at least one retainer hole 463 formed in at least one of rotation blocker walls 460, as shown, for example, in FIGS. 17 and 19. Retainer hole 463 is used to retain wiring 14 extending therethrough. Illustratively, there are three retainer holes 463 formed in each rotation blocker wall 460 for retaining multiple wires. Retainer holes 463 may have the same size or may have different sizes to receive wiring of different sizes.

Illustratively, mount 30, positioner sleeve 49, rotation blocker walls 460, and wiring retainer 424 cooperate to form a monolithic unit.

What is claimed is:

1. A wiring installation device for installing wiring in a facility to facilitate subsequent identification of the location of the wiring for attachment of the wiring to a system to provide a service thereto, the facility comprising a frame and a wall attached to the frame, the frame comprising a pair of frame members, the wall comprising a wall front side, a wall rear side, and a wall hole extending between the wall front side and the wall rear side, the wiring installation device comprising
    a cover support unit configured to extend behind the wall rear side, the cover support unit comprising a mount that is configured to be attached to the pair of frame members and comprises a mount hole that extends through the mount and is configured to be aligned with the wall hole,
    a wiring retainer, and
    a cover, the wiring retainer being attached to or configured to be attached to at least one of the cover support unit and the cover to retain the wiring adjacent the wall hole, the cover being configured for movement relative to the cover support unit between an uncovered position in which the cover uncovers the wall hole and a covered position in which the cover covers the wall hole adjacent the wall front side, extends through the wall hole and the mount hole, and is attached to the cover support unit at a location rearward of the mount.

2. The wiring installation device of claim 1, wherein the cover support unit comprises a cover support sleeve attached to and extending rearwardly from the mount, the cover comprises a cap configured to cover the wall hole and a coupler sleeve attached to the cap and configured to extend through the wall hole and the mount hole, and one of the cover support sleeve and the coupler sleeve comprises a thread for engagement with the other of the cover support sleeve and the coupler sleeve to attach the cover to the cover support unit.

3. The wiring installation device of claim 2, wherein an inner surface of the cover support sleeve comprises at least two bumps, and an outer surface of the coupler sleeve comprises the thread which engages the bumps when the cover is positioned in the covered position.

4. The wiring installation device of claim 2, wherein the wiring retainer comprises a retainer wall that is attached to the cover support sleeve and comprises a retainer hole for retention of wiring extending therethrough into the cover support sleeve.

5. The wiring installation device of claim 1, wherein the cover support unit comprises a cover support plate that is attached to a rear side of the mount and extends across and rearward of the mount hole, the wiring retainer comprises a retainer hole formed in the cover support plate for retention of wiring extending through the retainer hole, the cover support plate comprises a coupler hole, and the cover comprises a cap configured to cover the wall hole and a coupler attached to the cap and configured to extend through the wall hole and the mount hole into the coupler hole for engagement therewith to attach the cover to the cover support unit.

6. The wiring installation device of claim 5, wherein the coupler hole comprises a thread, and the coupler comprises a post that is attached to the cap and comprises a thread that engages the thread of the coupler hole when the cover is positioned in the covered position.

7. The wiring installation device of claim 6, wherein the post and the cap cooperate to form a monolithic unit.

8. The wiring installation device of claim 5, wherein the cover support plate comprises a plurality of coupler holes, the cap comprises a cap hole, and the coupler comprises a screw configured to extend through the cap hole, the wall hole, and the mount hole into one of the coupler holes for threaded engagement therewith.

9. The wiring installation device of claim 5, wherein the coupler comprises a plurality of fingers and a finger mover, the fingers are attached to the cap and configured to extend through the coupler hole, and the finger mover is configured to move the fingers away from one another into engagement with the cover support plate when the fingers extend through the coupler hole.

10. The wiring installation device of claim 9, wherein each finger comprises a lug, the cap comprises a cap hole, and the finger mover is configured to extend through the cap hole into a space between the fingers to move the fingers away from one another for engagement between the lugs of the fingers and the cover support plate.

11. The wiring installation device of claim 5, wherein the cover support plate comprises spaced apart side walls and an connector wall, the side walls are attached to and extend rearwardly away from the mount rear side, the connector wall is attached to the side walls and extends across the mount hole in spaced apart relation to the mount, and the connector wall comprises the coupler hole.

12. The wiring installation device of claim 11, wherein the connector wall comprises the retainer hole, and each of the side walls comprises another retainer hole for retention of wiring extending therethrough.

13. The wiring installation device of claim 1, wherein the cover support unit comprises a rotation blocker attached to a rear side of the mount, the wiring retainer comprises a retainer hole formed in the rotation blocker for retention of wiring extending through the retainer hole, the cover comprises a cap, a screw configured to extend through a cap hole formed in the cap, a nut for threaded engagement with the screw, a pair of relatively movable flanges attached to the nut, and a spring configured to move the flanges from a collapsed position in which the flanges are allowed to move through the wall hole and the mount hole to an extended position in which at least one of the flanges is configured to engage the rotation blocker so that rotation of the flanges is blocked by the rotation blocker to allow relative movement between the nut and the screw extending therethrough for threaded engagement therewith to cause engagement between the flanges and a rear side of the mount.

14. The wiring installation device of claim 13, wherein the rotation blocker comprises spaced-apart first and second rotation blocker walls attached to the mount rear side for engagement with the flanges, and the retainer hole is formed in one of the rotation blocker walls.

15. The wiring installation device of claim 1, wherein the cover support unit comprises a cover support attached to and extending rearwardly from a rear side of the mount, and the cover is configured for attachment to the cover support.

16. The wiring installation device of claim 15, wherein the cover support and the cover are configured for threaded engagement therebetween.

17. The wiring installation device of claim 1, wherein the cover comprises a coupler that is configured to attach cover to cover support unit and comprises a thread.

18. The wiring installation device of claim 1, wherein the mount is a generally flat, elongated plate comprising first and second attachment portions configured for attachment to the frame members and an intermediate portion that extends between the first and second attachment portions and comprises the mount hole and first and second tool holes between which the mount hole is positioned, and each of the first and second tool holes is configured to receive a cutting tool when the cutting tool is used to cut the intermediate portion away from the attachment portions.

19. The wiring installation device of claim 18, comprising a pair of fasteners, wherein each of the first and second attachment portions comprises a fastener hole to receive one of the fasteners therethrough into one of the frame members, and the first and second tool holes are larger than the fastener holes.

20. The wiring installation device of claim 1, wherein the mount comprises first and second attachment portions configured for attachment to the frame members, an intermediate portion extending between the first and second attachment portions and comprising the mount hole, and a frangible portion positioned between each attachment portion and the intermediate portion for detachment of pieces of the intermediate portion from the first and second attachment portions.

21. The wiring installation device of claim 20, wherein each frangible portion is a reduced thickness groove recessed from a front side of the mount toward a rear side of the mount.

22. The wiring installation device of claim 1, wherein the cover support unit comprises a sleeve attached to a front side of the mount and configured to extend in the wall hole, and the cover extends through the sleeve when the cover is positioned in the covered position.

23. The wiring installation device of claim 1, wherein the wiring retainer is attached to the cover support unit at a location rearward of the mount.

24. A wiring installation device for installing wiring in a facility to facilitate subsequent identification of the location of the wiring for attachment of the wiring to a system to provide a service thereto, the facility comprising a frame and a wall attached to the frame, the frame comprising a pair of frame members, the wall comprising a wall front side, a wall rear side, and a wall hole extending between the wall front side and the wall rear side, the wiring installation device comprising a mount that is configured to extend behind the wall rear side and comprises a mount front side, a mount rear side, and a mount hole extending between the mount front side and the mount rear side, a first sleeve attached to the mount front side and configured to extend into the wall hole, a cover support sleeve attached to the mount rear side, a wiring retainer wall that is attached to the cover support sleeve and comprises a retainer hole for retention of wiring extending therethrough into the cover support sleeve, and a cover comprising a cap and a coupler sleeve attached to the cap, the cover being configured for movement between an uncovered position in which the cap uncovers the wall hole and a covered position in which the cap covers the wall hole adjacent the wall front side, the coupler sleeve extends through the first sleeve positioned in the wall hole and through the mount hole into the cover support sleeve, and a thread of one of the coupler sleeve and the cover support sleeve engages the other of the coupler sleeve and the cover support sleeve.

25. The wiring installation device of claim 24, wherein an inner surface of the cover support sleeve comprises at least two bumps, and an outer surface of the coupler sleeve comprises the thread which engages the bumps when the cover is positioned in the covered position.

\* \* \* \* \*